UNITED STATES PATENT OFFICE 2,651,958

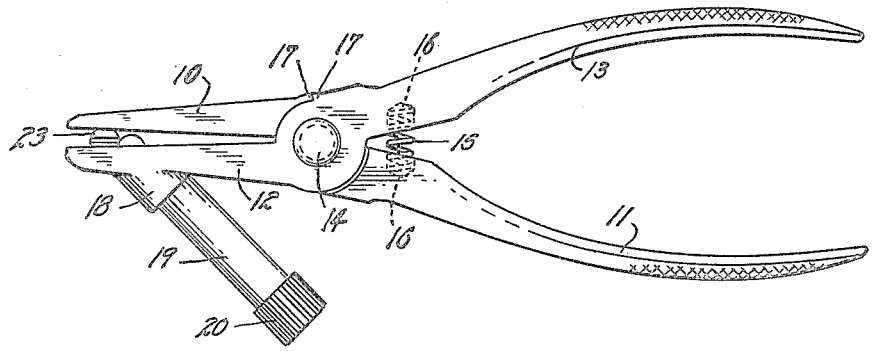
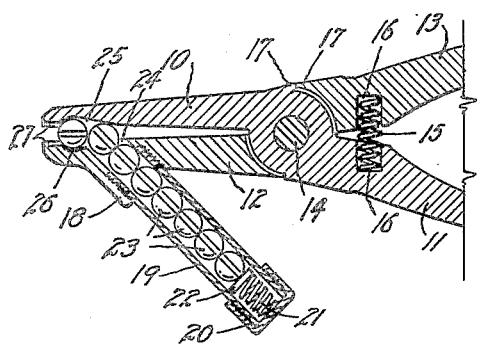
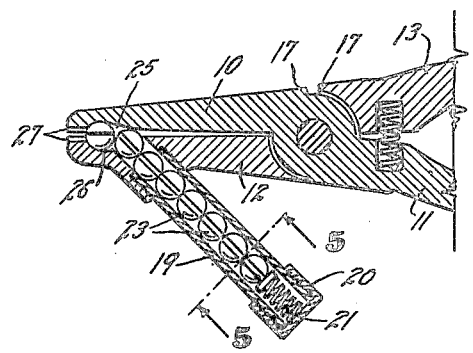
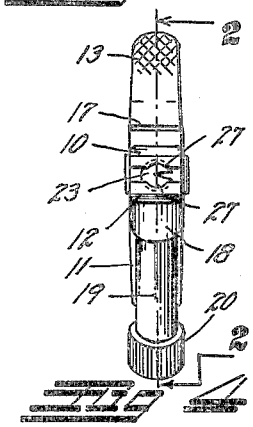

PLIERS FOR APPLYING SPLIT-SHOT FISHING SINKERS

Walter W. Deline, Denver, Colo.

Application October 29, 1951, Serial No. 253,736

2 Claims. (Cl. 81—15)

This invention relates to a fisherman's tool for applying weights or sinkers of the split-shot type to fishing lines, and has for its principal object the provision of a simple and highly efficient, plier-type tool which can be operated by only one hand, and which will hold a supply of split-shot and automatically feed the shot to a pressing device for applying the shot to a fishing line.

Another object is to provide a tool of this character which will be light in weight, and which will lie flat in the pocket of the fisherman.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved split-shot tool for fishermen, illustrating the latter in the normal or open position;

Fig. 2 is a fragmentary, longitudinal section through the jaw portion of the tool, illustrating the latter in the open position;

Fig. 3 is a similar section, illustrating the tool in the closed position;

Fig. 4 is a front view of the improved fisherman's tool; and

Fig. 5 is a detail cross-section, taken on the line 5—5, Fig. 3, illustrating a shot reservoir employed on the improved tool.

While the improved split-shot closing tool has been illustrated for convenience in one position, it is to be understood that it may be inverted or turned for use in any desired position.

The improved tool employs a pressure jaw 10 formed on the forward extremity of a first handle member 11, and a reservoir jaw 12 formed on the forward extremity of a second handle member 13. The two handle members are hinged together in crossed plier-like relation by means of a hinge pin 14.

The two handle members are constantly urged apart by means of a compression spring 15 which is compressed between and mounted in suitable receiving sockets 16 in the handle members. The separating movement of the handle members is limited to a predetermined distance in any desired manner, such as by means of contacting stop shoulders 17 formed on the pivotal portions of the handle members and jaws. These shoulders come into contact with each other to stop the opening movement of the jaws at a predetermined spacing.

An internally threaded receiving socket 18 is formed on the reservoir jaw 12 into which the inner extremity of a tubular shot reservoir 19 is threaded. The outer extremity of the shot reservoir is closed by a cap 20 threaded thereon. A relatively long, resilient, compression spring 21 is mounted in the cap 20 and acts to force a plunger 22 against a row of conventional split-shot 23 contained within the reservoir.

The reservoir opens at its inner extremity through a shot passage 24 in the reservoir jaw 12 through which the shot are successively forced by the spring 21, or by gravity if the tool is inverted. The shot emerging from the passage 24 contact the inclined bottom of an elongated receiving socket 25 formed in the pressure jaw 10. The incline of the bottom of the socket 25 causes the innermost shot to roll forwardly to the forward and deeper extremity of the receiving socket 25, as shown in Fig. 2.

When the shot reaches its forward position in the elongated socket 25 it is positioned over a semi-spherical retaining depression 26 which is formed in the reservoir jaw 12 forwardly of the shot passage 24. The fishing line is now passed through the split in the shot and the handle members are squeezed together to cause the jaws to contract the shot and close the split therein upon the line. The contraction of the shot reduces the diameter thereof sufficiently to allow it to be drawn forwardly through and between a pair of oppositely facing discharge grooves 21 formed in the jaws 10 and 12. The next successive shot then immediately replaces the withdrawn shot.

The degree of separation of the jaws is limited by the stop shoulders 17 so that an open split-shot will be securely retained between the socket 25 and the depression 26 so that it cannot fall from between the jaws. When the shot has been compressed to close its split, however, it can be easily drawn forwardly in the grooves.

The splits in the aligned shot are maintained in alignment by means of an inwardly extending, elongated spline 28 formed on and extending longitudinally of the inner wall of the tubular reservoir 19, as shown in Fig. 5. The spline 28 engages in the splits of the shot so that they will all enter between the jaws in the same position. This causes the shot to come to rest between the jaws with the split in a convenient position to engage the fishing line.

It can be seen that only one hand is necessary for placing and contracting the shot on the line, leaving the other hand free for holding and handling the line.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A split-shot applying tool comprising: a pressure jaw formed on the forward extremity of a first handle member; a reservoir jaw formed on the forward extremity of a second handle member; a hinge member hinging said two handle members together in crossed, plier-like relation so that the adjacent faces of said two jaws can be forced toward each other; an elongated, shot-receiving socket in the adjacent face of said pressure jaw, said socket increasing in depth as the extremity of said latter jaw is approached; a semi-spherical depression formed in the adjacent face of said reservoir jaw, said depression being positioned opposite the deeper extremity of said socket to cooperate with the latter to form a shot-compressing pocket; a shot passage through said reservoir jaw adjacent said depression, said passage terminating opposite the shallower extremity of the socket in the pressure jaw, so that a first shot emerging from said passage will be urged forwardly due to the increasing depth of said socket until it reaches a position between the deepest end of said socket and said depression, and so that a second shot following the first shot will lie against the first shot in a position between the shallower extremity of said socket and said shot passage so that when the adjacent faces of said jaws are forced together, the first shot will be compressed and the second shot will be forced back into said shot passage; and resilient means urging the shot from said passage.

2. A split-shot applying tool as described in claim 1 having a first groove in said pressure jaw extending forwardly from the deeper end of said socket to the forward extremity of said latter jaw; and a second similar groove in said reservoir jaw extending forwardly from said socket to the forward extremity of said latter jaw, said grooves cooperating to form an exit channel for said shot and being of less depth than the deeper extremity of said socket and of less depth than said depression, so as to prevent shot from passing through said exit channel until it has been compressed between said jaws.

WALTER W. DELINE.

References Cited in the file of this patent

UNITED STATES PATENTS

| Number | Name | Date |
|---|---|---|
| 977,124 | Parker | Nov. 29, 1910 |
| 1,290,331 | Partlow | Jan. 7, 1919 |
| 1,451,717 | Sommer | Apr. 17, 1923 |
| 1,753,080 | Zwilling et al. | Apr. 1, 1930 |
| 1,847,067 | Brouwers | Mar. 1, 1932 |
| 2,385,951 | Stelzer | Oct. 2, 1945 |
| 2,571,819 | Boel et al. | Oct. 16, 1951 |

FOREIGN PATENTS

| Number | Country | Date |
|---|---|---|
| 46,879 | Switzerland | Apr. 24, 1909 |